United States Patent
Lee et al.

(10) Patent No.: US 7,168,482 B2
(45) Date of Patent: Jan. 30, 2007

(54) HEAT EXCHANGER OF VENTILATING SYSTEM

(75) Inventors: Seong-Hwan Lee, Kyungsangnam-Do (KR); Soo-Yeon Shin, Kyungsangnam-Do (KR); Min-Chul Cho, Busan (KR); Sung-Hwa Lee, Kyungsangnam-Do (KR); Kwang-Won Lee, Kyungsangnam-Do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/537,831

(22) PCT Filed: Feb. 3, 2003

(86) PCT No.: PCT/KR03/00236

§ 371 (c)(1),
(2), (4) Date: Jun. 8, 2005

(87) PCT Pub. No.: WO2004/070284

PCT Pub. Date: Aug. 19, 2004

(65) Prior Publication Data

US 2006/0011331 A1  Jan. 19, 2006

(51) Int. Cl.
*F28F 3/08* (2006.01)
(52) U.S. Cl. .................... 165/166; 165/167
(58) Field of Classification Search ............. 165/164, 165/166, 167
See application file for complete search history.

(56) References Cited

U.S. PATENT DOCUMENTS

| | | | |
|---|---|---|---|
| 3,982,981 A * | 9/1976 | Takao et al. ............ | 165/166 |
| 4,449,992 A | 5/1984 | Yamada | |
| 4,460,388 A * | 7/1984 | Fukami et al. ............ | 165/166 |
| 4,616,695 A * | 10/1986 | Takahashi et al. .......... | 165/166 |
| 5,306,392 A * | 4/1994 | Mita ........................... | 162/76 |
| 6,019,170 A | 2/2000 | Yokoya | |
| 6,032,730 A * | 3/2000 | Akita et al. ................ | 165/166 |
| 6,244,333 B1 * | 6/2001 | Bergh et al. ............... | 165/165 |
| 6,695,611 B1 * | 2/2004 | Lee ........................... | 431/293 |

FOREIGN PATENT DOCUMENTS

| | | | |
|---|---|---|---|
| JP | 59-107198 | * | 6/1984 |
| JP | 59-107198 A | | 6/1984 |
| JP | 11-189999 | * | 7/1999 |
| JP | 11-189999 A | | 7/1999 |
| KR | 2000-0010461 U | | 6/2000 |
| KR | 10-2002-0078877 A | | 10/2002 |

* cited by examiner

*Primary Examiner*—Teresa J. Walberg
(74) *Attorney, Agent, or Firm*—Birch, Stewart, Kolasch & Birch, LLP

(57) ABSTRACT

A heat exchanger of a ventilating system includes: heat exchange plates laminated with regular intervals so that a first air passage through which indoor air being discharged to outside of a building passes and a second air passage through which outdoor air being introduced into the interior of the building passes are sequentially formed; first corrugation plates attached to the first air passage and obtaining a space to allow outdoor air to pass therethrough; and second corrugation plates attached to the second air passage and obtaining a space to allow outdoor air to passtherethrough, wherein the heat exchange plates are made of a paper material with numerous fine holes that are able to generate a capillary phenomenon. A sensible heat exchange and a latent heat exchange are possible to minimize a change in a temperature and moisture.

11 Claims, 6 Drawing Sheets

HEAT EXCHANGER OF VENTILATING SYSTEM

TECHNICAL FIELD

The present invention relates to a heat exchanger for exchanging indoor air and outdoor air and, more particularly, to a heat exchanger of a ventilating system that is capable of exchanging sensible heat and latent heat between indoor air and outdoor air.

BACKGROUND ART

In general, a ventilating system is a device intended for discharging foul indoor air to outside a building and sucking outdoor fresh air into the interior of the building, which includes an air cleaner for removing dusts and foreign materials contained in indoor air and a heat exchanger for transferring heat of indoor air being discharged to outdoor air being sucked.

FIG. 1 is a perspective view of a general ventilating system.

As illustrated, the ventilating system includes a case 2 mounted in a wall of a building which sections an outdoor side and an indoor side; blast fans 4 and 6 inserted in the case 2 and performing a ventilating operation on air being sucked and discharged, an air cleaner (not shown) installed at a portion in the case where outdoor air is sucked and cleaning outdoor air being sucked, and a heat exchanger 8 disposed inside the case 2 and performing heat exchanging between indoor air being discharged and outdoor air being sucked.

The case 2 is mounted penetrating the wall sectioning the indoor side and the outdoor side. Thus, one side of the case is positioned at the interior of the building while the other side is positioned at the exterior of the building. An outdoor suction opening 10 through which outdoor air is sucked and an outdoor discharge opening 12 through which indoor air is discharged are formed at the outdoor side of the case 2. An indoor discharge opening 14 through which outdoor air is supplied and an indoor suction opening 16 through which indoor air is sucked are formed at the indoor side of the case 2.

The discharging blast fans 4 is installed at one side of the outdoor discharge opening 12 and provides a blast pressure to discharge indoor air to the exterior of the building, and the sucking blast fan 6 is installed at one side of the indoor discharge opening 14 and provides a blast pressure to suck outdoor air to the interior of the building.

FIG. 2 is a perspective view of a heat exchanger for a ventilating system in accordance with a conventional art, and FIG. 3 is a partial perspective view of the heat exchanger.

A heat exchanger 8 in accordance with the conventional art includes: heat exchange plates 20 laminated with regular intervals so that a first air passage 26 through which indoor air passes and a second air passage 28 through which outdoor air passes are sequentially formed; first corrugation plates 22 attached to the first air passages 26 between the heat exchange plates 20 and obtaining a space for allowing indoor air to pass through; and second corrugation plates 24 attached to the second air passage 28 between the heat exchange plates 20 and obtaining a space to allow outdoor air to pass through.

The heat exchange plates 20 are formed in a flat type, made of an aluminum material and carries out a heat exchanging operation between indoor air flowing through the first air passage 26 and outdoor air flowing through the second air passage 28.

The first and second corrugation plates 22 and 24 are made of the same aluminum material as that of the heat exchange plates 20, and bent several times in a triangular form to obtain the space through which indoor air and outdoor air can pass.

With such a structure, the heat exchanger 8 is constructed overall in a rectangular form as the first corrugation plates 22, the heat exchange plates 20 and the second corrugation plates 24 are sequentially laminated.

When outdoor air passes through the first corrugation plates 22 and indoor air passes through the second corrugation plates, that is, which pass in a crossing manner, heat exchanging is carried out that heat of indoor air is transferred to outdoor air through the heat exchange plates 20.

The operation of the heat exchanger for a ventilating system constructed as described above in accordance with the conventional art will now be explained.

When the discharging blast fan 4 is driven, indoor air is sucked into the indoor suction opening 16, passes the first air passage 26 and is discharged to the outside through the outdoor discharge opening 12.

And when the sucking blast fan 6 is driven, outdoor air is sucked into the outdoor suction opening 10, passes the second air passage 28 and is supplied to the interior of the building through the indoor discharge opening 14.

At this time, as indoor air passing through the first air passages 26 and outdoor air passing through the second air passages 28 flow crossing each other, heat of indoor air is transferred to outdoor air through the heat exchange plates 20 and outdoor air which has absorbed the heat of indoor air is supplied to the interior of the building.

In this manner, the outdoor air being sucked absorbs heat contained in indoor air being discharged and is discharged to the interior of the building, so that a rapid change in an indoor temperature is prevented in a ventilating operation.

However, the heat exchanger of a ventilating system of the conventional art has the following problem.

That is, since the heat exchanging plate 20, the first corrugation plate 22 and the second corrugation plate 24 are made of the aluminum material, heat transfer is possibly performed that heat of indoor air is transferred to outdoor air in terms of the properties of the aluminum material. At this time, however, since moisture contained in the indoor air fails to be transferred to the outdoor air, although the change in the indoor temperature can be reduced after the ventilating operation, a humidity changes.

DISCLOSURE OF THE INVENTION

Therefore, it is an object of the present invention to provide a heat exchanger of a ventilating system that is capable of performing a latent heat exchange that outdoor air absorbs moisture contained in indoor air as well as performing a sensible heat exchange that heat contained in indoor air being discharged to outside a building is transferred to outdoor air being introduced to the interior of the building, thereby minimizing a change in an indoor temperature and humidity during a ventilating operation.

To achieve the object, there is provided a heat exchanger of a ventilating system including: heat exchange plates laminated with regular intervals so that a first air passage through which indoor air being discharged to outside of a building passes and a second air passage through which outdoor air being introduced into the interior of the building passes are sequentially formed; first corrugation plates attached to the first air passage and obtaining a space to allow outdoor air to pass therethrough; and second corrugation plates attached to the second air passage and obtaining a space to allow outdoor air to pass therethrough, wherein the heat exchange plates are made of a paper material with numerous fine holes that are able to generate a capillary phenomenon.

In the heat exchanger of a ventilating system in accordance with the present invention, the heat exchange plates are made of a Korean paper with a high fiber strength and numerous fine holes that are able to generate a capillary phenomenon.

In the heat exchanger of a ventilating system in accordance with the present invention, the heat exchange plates contains 60~70%, of holo cellulose, 10~20% of lignin and 5~10% of lime.

In the heat exchanger of a ventilating system in accordance with the present invention, the Korean paper constituting the heat exchange plates is fabricated with bast fiber of the paper mulberry as a key component.

In the heat exchanger of a ventilating system in accordance with the present invention, a process for fabricating the heat exchanging plate with the Korean paper includes the steps of: bundling the paper mulberry, putting it in a container with water, boiling it to a degree that its skin is easily peeled off, peeling and drying them; soaking the dried skin of the paper mulberry in the water, sorting out only the bast fiber portion, putting the bast fiber portion in caustic soda and boiling it more than three hours, and wringing it with a compressor; putting the moisture-removed bast fiber in a liquid which has been prepared by mashing roots of the paper mulberry and pressing them out, and mixing them evenly, and filtering the resulting paper solution by using a sieve.

To achieve the above object, there is also provided a heat exchanger of a ventilating system including: heat exchange plates laminated with regular intervals so that a first air passage through which indoor air being discharged to outside of a building passes and a second air passage through which outdoor air being introduced into the interior of the building passes are sequentially formed; first corrugation plates attached to the first air passage and obtaining a space to allow outdoor air to pass therethrough; and second corrugation plates attached to the second air passage and obtaining a space to allow outdoor air to pass therethrough, wherein the heat exchange plates, the first corrugation plates and the second corrugation plates are made of a paper material which is able to generate a capillary phenomenon.

MODES FOR CARRYING OUT THE PREFERRED EMBODIMENTS

A heat exchanger of a ventilating system in accordance with preferred embodiments of the present invention will now be described with reference to the accompanying drawings.

There can be several embodiments of the heat exchanger of a ventilating system in accordance with the present invention, of which preferred ones will be described.

Figure 4:
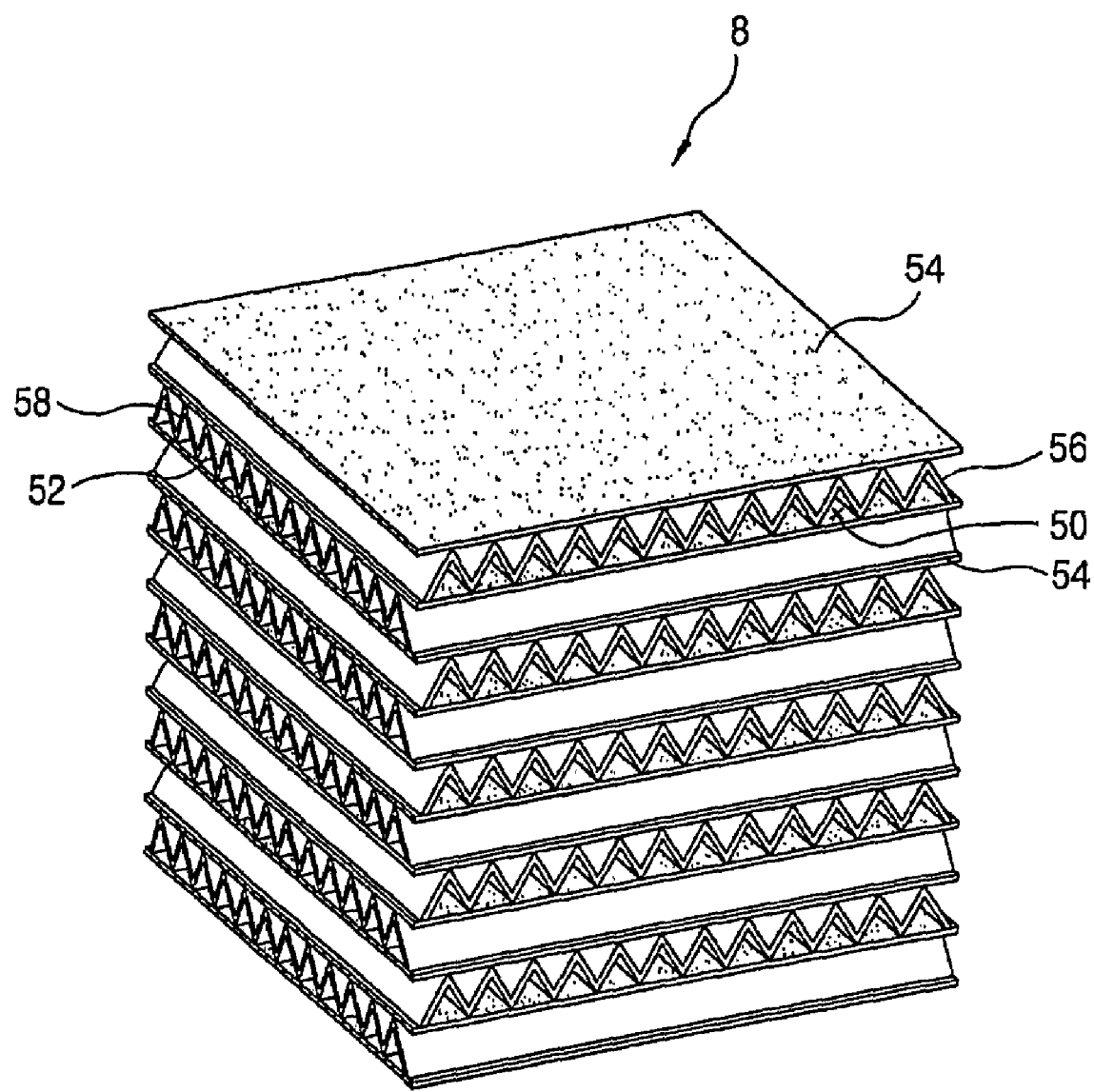
FIG. 4 is a perspective view of a heat exchanger of a ventilating system in accordance with one embodiment of the present invention.

FIG. 4 is a perspective view of a heat exchanger of a ventilating system in accordance with one embodiment of the present invention.

Figure 1:
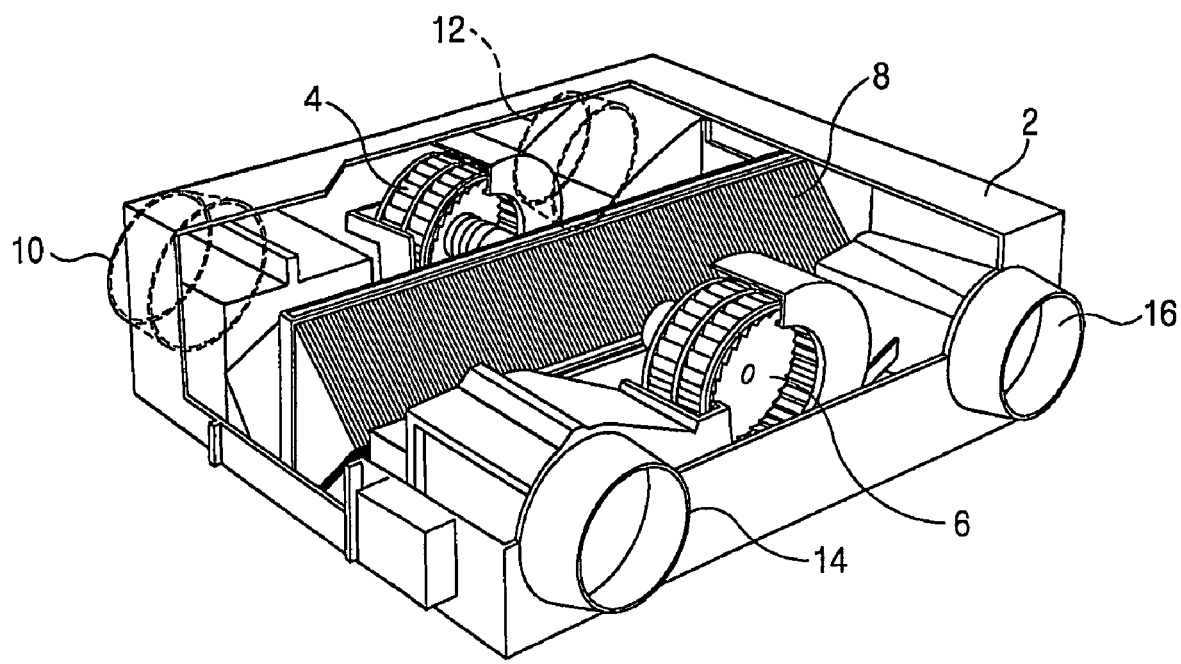
FIG. 1 is a partially cut perspective view showing the construction of a general ventilating system.
Figure 2:
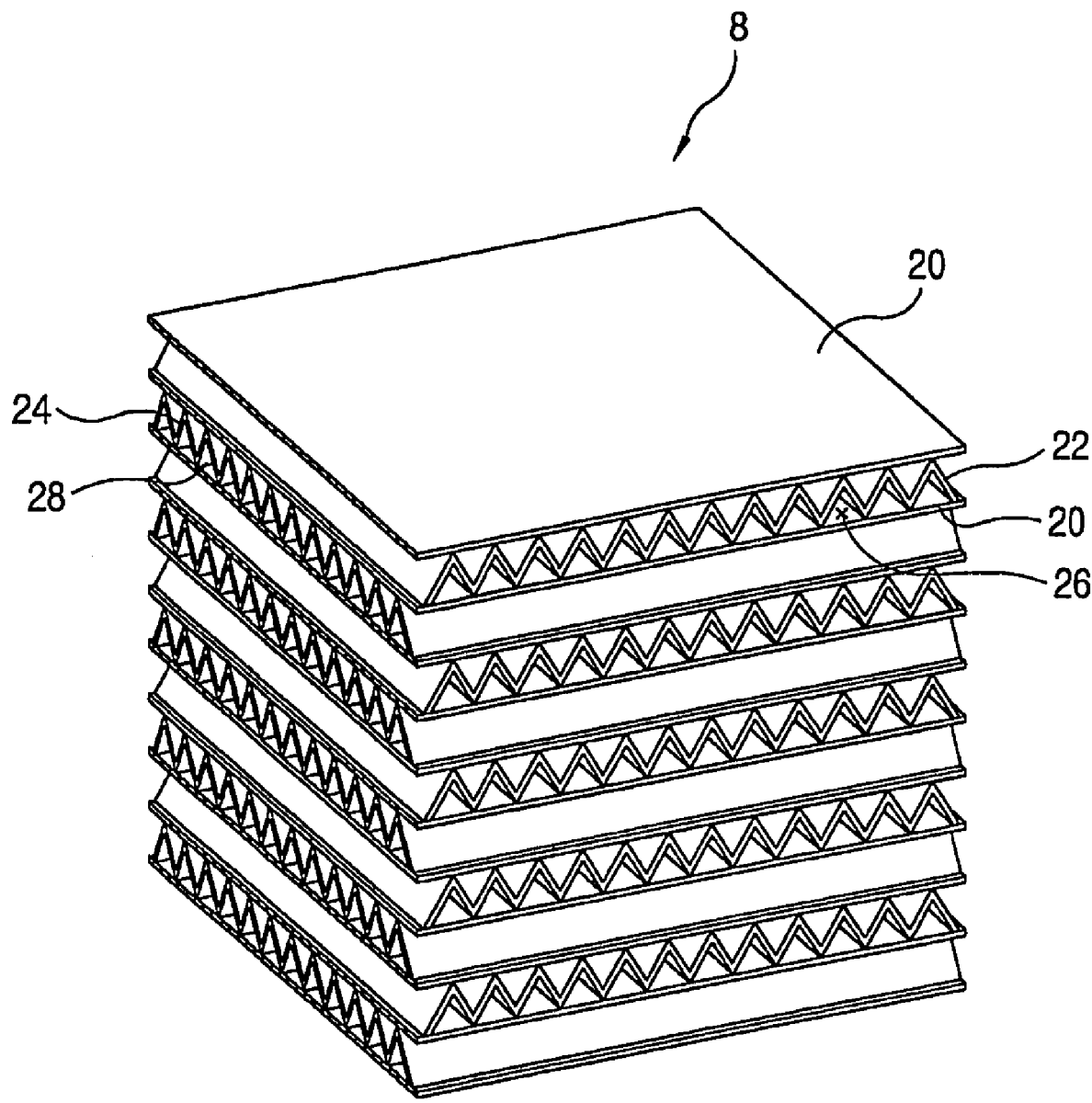
FIG. 2 is a perspective view of a heat exchanger of a ventilating system in accordance with a conventional art.
Figure 3:
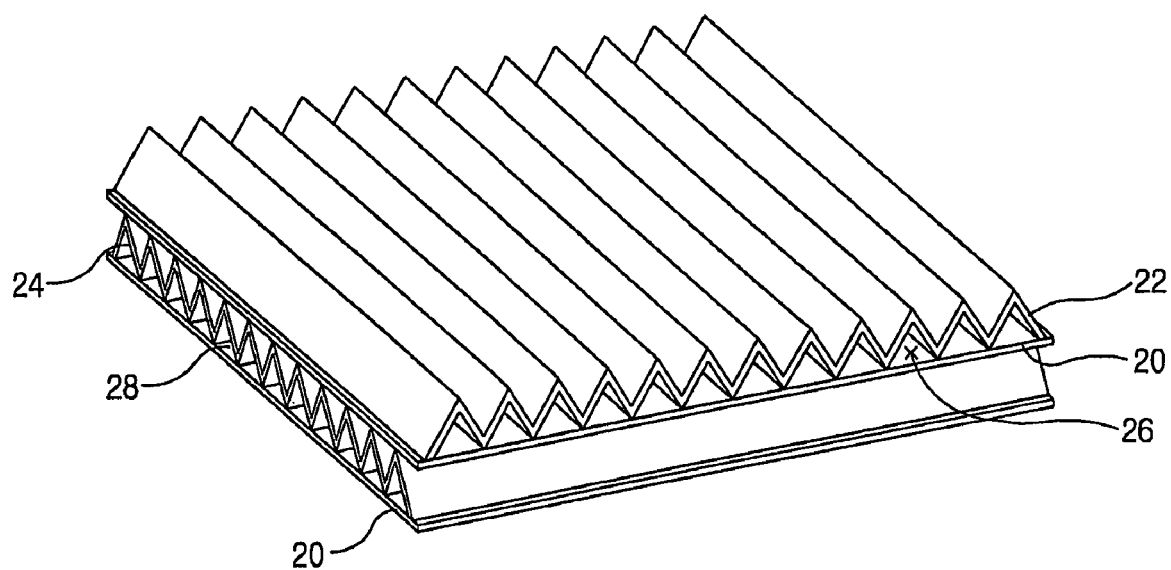
FIG. 3 is a partial perspective view of the heat exchanger of a ventilating system in accordance with the conventional art.

With reference back to FIG. 1, a ventilating system of the present invention includes a case 2 mounted penetratingly in a wall of a building that sections an outdoor side and an indoor side of the building. That is, one side of the case 2 is positioned at the exterior of the building while the other side of the case 2 is positioned at the interior of the building.

The outdoor suction opening 10 through which outdoor air is sucked and an outdoor discharge opening 12 through which indoor air is discharged are respectively connected at the outdoor side of the case 2, while an indoor suction opening 14 through which indoor air is sucked and an indoor discharge opening 16 through which outdoor air is supplied to the interior of the building are connected at the indoor side of the case 2.

A discharging blast fan 4 is installed to at one side of the outdoor discharge opening 12 to generate a blast force to discharge indoor air to the exterior of the building, and a sucking blast fan 6 is installed at one side of the indoor discharge opening 14 to generate a blast force to suck outdoor air to the interior of the building.

An air cleaner (not shown) is installed on a suction passage inside the case 2 to remove various impurities and dusts contained in outdoor air being sucked to the interior of the building, and a heat exchanger 8 is installed inside the case 2 to carry out a heat exchanging operation between indoor air being discharge to the exterior of the building and outdoor air being sucked to the interior of the building.

As shown in FIG. 4, the heat exchanger 8 includes heat exchange plates 54 laminated with predetermined intervals so that a first air passage 50 through which indoor air passes and a second air passage 52 through which outdoor air passes are sequentially formed; a first corrugation plate 56 attached on the first air passage 50 to obtain a space through which the indoor air passes; and a second corrugation plate 58 attached on the second air passage 52 to obtain a space through which the outdoor air passes.

The heat exchanger 8 has a rectangular form in an overall shape, and the first corrugation plate 56 and the second corrugation plate 58 are arranged to be crossed, so that indoor air and outdoor air flow in the crossing manner, during which heat exchange is carried out through the heat exchange plates 54.

The heat exchange plate 54 has a thin flat type and is made of a material which is able to pass moisture therethrough so that moisture contained in the indoor air flowing in the first air passage 50 can be transferred to outdoor air flowing in the second air passage 52.

Figure 5:
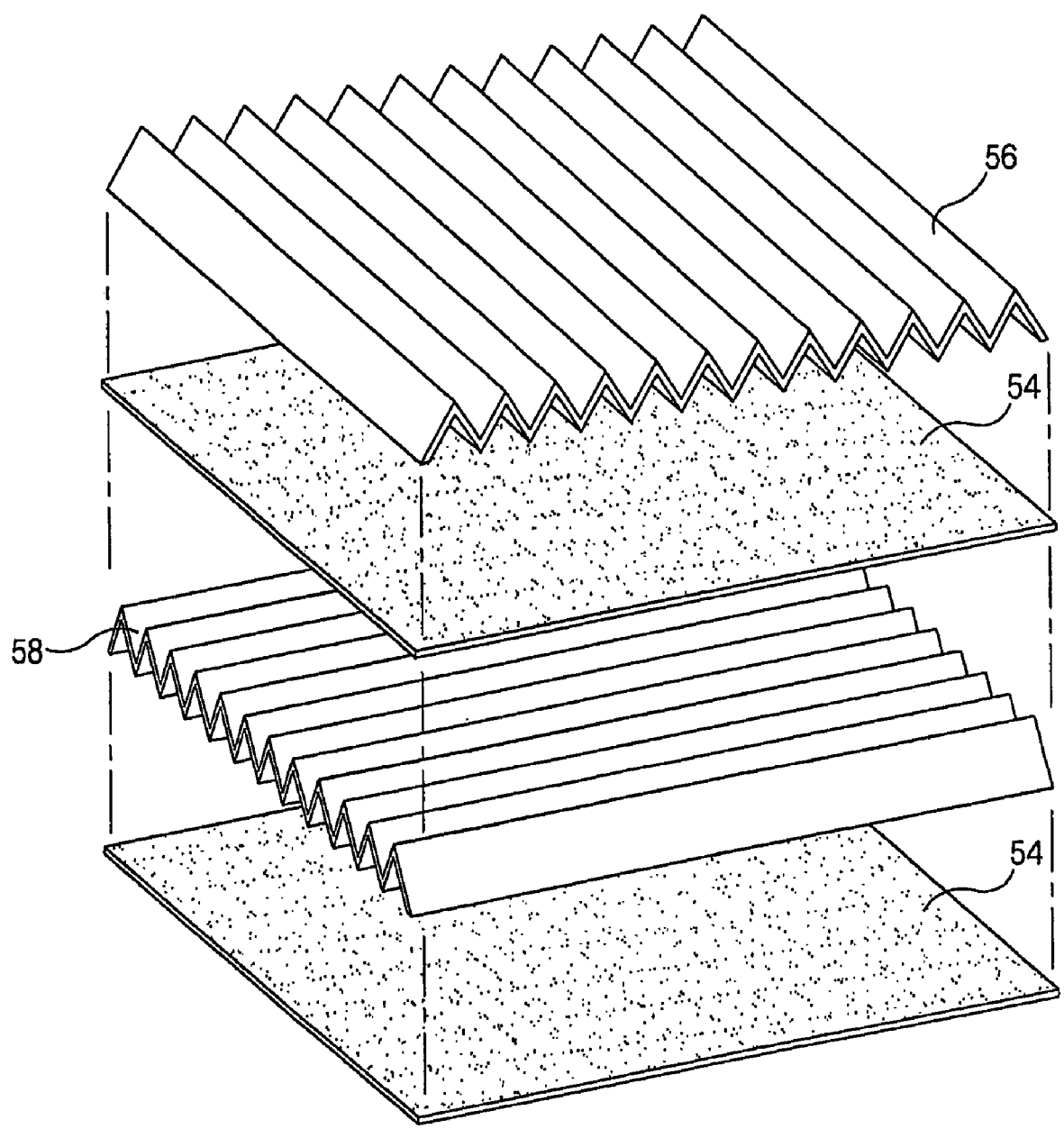
FIG. 5 is an exploded perspective view of the heat exchanger of a ventilating system in accordance with one embodiment of the present invention.

In other words, as shown in FIG. 5, the heat exchange plate is made of a paper material with an excellent moisture absorption rate. Preferably, the heat exchange plate 54 is made of a Korean paper with numerous fine holes that is able to generate a capillary phenomenon.

The Korean paper is fabricated by a Korean particular method, of which main ingredient is the bast fiber of paper mulberry.

The fabrication process of the Korean paper includes the steps of: bundling the paper mulberry, putting it in a container with water, boiling it to a degree that its skin is easily peeled off, peeling and drying them; soaking the dried skin of the paper mulberry in the water, sorting out only the bast fiber portion, putting the bast fiber portion in caustic soda and boiling it more than three hours, and wringing it with a compressor; putting the moisture-removed bast fiber in a liquid which has been prepared by mashing roots of the paper mulberry and pressing them out, and mixing them evenly, and filtering the resulting paper solution by using a sieve.

The Korean paper completed by the fabrication process contains 60~70% of holo cellulose, 10~20% of lignin and 5~10% of lime. More specifically, it is preferred that the Korean paper comprises 67.5% of holo cellulose, 14.7% of lignin and 6.22% of lime.

Referring to the Korean paper, since its fibers are long in length, narrower in width, fibers are combined tightly, and since fibrils forming the fiber of cellulose are oriented in an axial direction, the fibers have a high strength. Thus, compared to the general paper, the Korean paper has such an advantage that it can be preserved for a long period. In addition, the numerous fine holes formed between fibers generates the capillary phenomenon, resulting in an excellent moisture absorption capacity.

Accordingly, fabrication of the heat exchange plate 54 with the Korean material ensures a latent heat function as moisture contained in indoor air is absorbed to the heat exchange plate 54 which is then transferred to outdoor air.

The operation of the heat exchanger constructed as described above will now be described.

When the discharging blast fan 4 is driven, indoor air is sucked into the indoor suction opening 16, passes through the first air passage 50 with the first corrugation plate 56 attached thereto and is discharged through the outdoor discharge opening 12 to the exterior of the building.

When the sucking blast fan 6 is driven, outdoor air is sucked into the outdoor suction opening 10, passes through the second air passage 52 with the second corrugation plate 58 attached thereto, and is supplied to the interior of the building through the indoor discharge opening 14.

As the indoor air passing through the first corrugation plate 56 of the first air passage 50 and the outdoor air passing through the second corrugation plate 58 of the second air passage 52 flow to cross each other, heat and moisture of the indoor air is transferred to the outdoor air through the heat exchange plate and the outdoor air which has absorbed heat and moisture of the indoor air is supplied to the interior of the building.

That is, the heat exchange plate 56 is made of the Korean paper material, so that a heat transfer performance of transferring heat of indoor air to outdoor air betters. And thanks to the capillary phenomenon occurring by the numerous fine holes formed in the heat exchange plate 54, moisture contained in the indoor air is absorbed to the heat transfer plate 56, which is then transferred to the outdoor air, according to which the outdoor air sucked to the interior of the building contains heat with a temperature as high as the indoor air being discharged to outside the building and moisture as much as that of the indoor air. Therefore, the temperature and moisture change in the indoor environment can be minimized in the ventilating operation.

Figure 6:
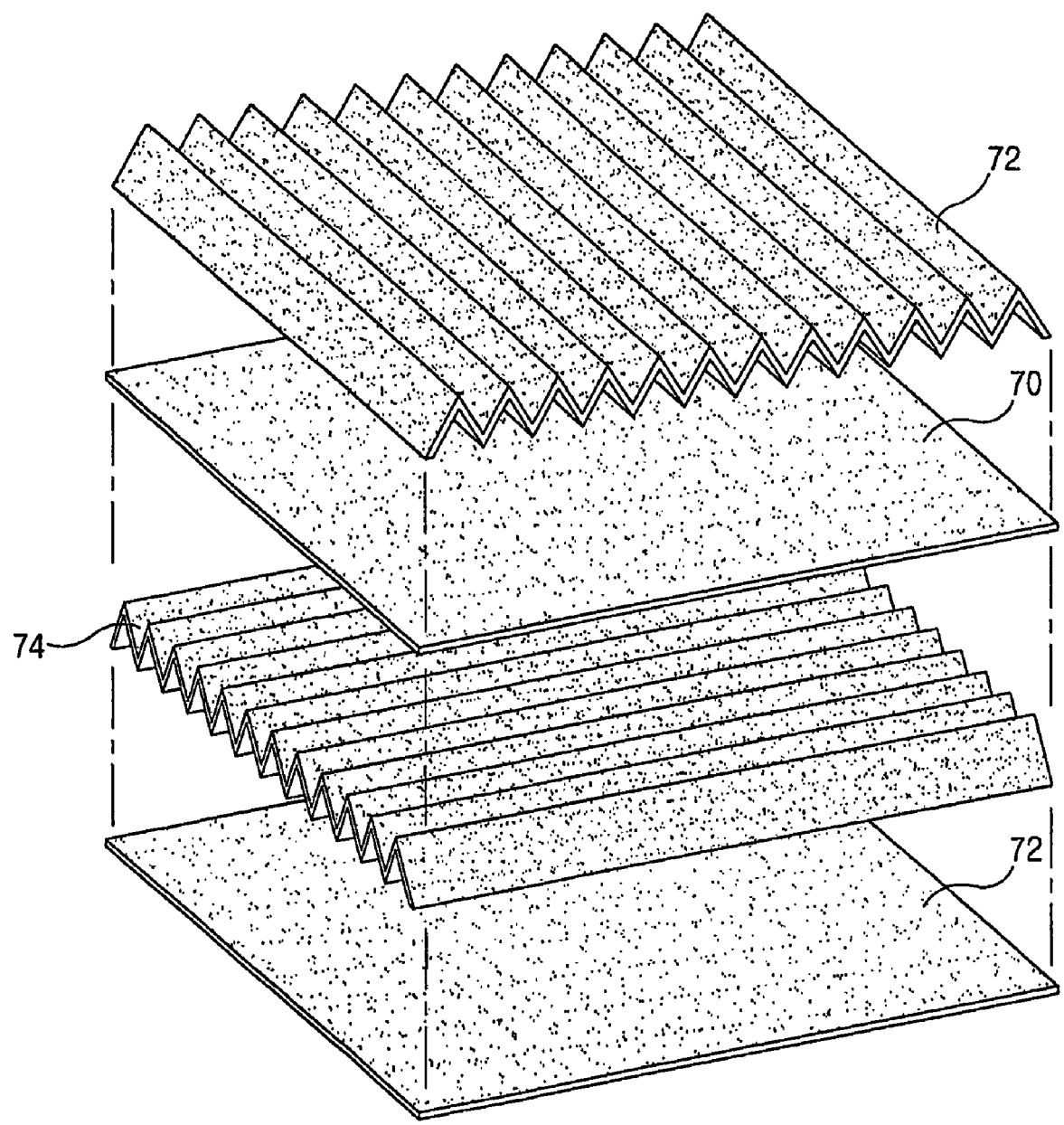
FIG. 6 is an exploded perspective view of the heat exchanger of a ventilating system in accordance with another embodiment of the present invention.

FIG. 6 is a perspective view of a heat exchanger in accordance with another embodiment of the present invention.

Including a heat exchange plate 70, a first, corrugation plate 72 and a second corrugation plate 74, a heat exchanger in accordance with another embodiment has the same structure as that of one embodiment of the present invention, except that the heat exchange plate 70, the first corrugation plate 72 and the second corrugation plate 74 are fabricated with the Korean paper.

That is, the heat exchange plate 70, the first corrugation plate 72 and the second corrugation plate 74 are fabricated with the Korean paper, through which moisture contained in indoor air can be transferred to outdoor air, so that heat and moisture transfer performances better.

The construction and fabrication method of the Korean paper are the same as described in one embodiment of the present invention.

As so far described, the heat exchanger of a ventilating system in accordance with the present invention has the following advantage.

That is, the heat exchange plate is made of the paper material with numerous fine holes generating a capillary phenomenon, so that a sensible exchange that heat contained in indoor air being discharged outside a building is transferred to outdoor air being sucked to the interior of the building and a latent exchange that moisture contained in indoor air being discharged to outside the building is transferred to outdoor air being sucked to the interior of the building are simultaneously performed. Therefore, a change in temperature and moisture in the exterior of the building can be minimized in a ventilating operation.

It will be apparent to those skilled in the art that various modifications and variations can be made in the heat exchanger of a ventilating system of the present invention without departing from the spirit or scope of the invention. Thus, it is intended that the present invention cover modifications and variations of this invention provided they come within the scope of the appended; claims and their equivalents.

The invention claimed is:

1. A heat exchanger of a ventilating system comprising:
   heat exchange plates laminated with regular intervals so that a first air passage though which indoor air being discharged to outside of a building passes and a second air passage though which outdoor air being introduced into the interior of the building passes are sequentially formed;
   first corrugation plates attached to the first air passage and obtaining a space to allow the indoor air to pass therethrough; and
   second corrugation plates attached to the second air passage and obtaining a space to allow the outdoor air to pass therethrough,
   wherein the heat exchange plates are made of a paper material with fiber intensity and with a plurality of fine holes that are able to generate a capillary action, moisture of one of the indoor air in the first air passage and the outdoor air in the second air passage being absorbed by the plurality of fine holes due to the capillary action and being directly transferred from the plurality of fine holes to the other one of the indoor air in the first air passage and the outdoor air in the second air passage.

2. The heat exchanger of claim 1, wherein the heat exchange plates are made of a Korean paper.

3. The heat exchanger of claim 2, wherein the heat exchange plates contains 60~70% of holo cellulose, 10~20% of lignin and 5~10% of lime.

4. The heat exchanger of claim 2, wherein the Korean paper constituting the heat exchange plates is fabricated with bast fiber of a paper mulberry as a key component.

5. The heat exchanger of claim 4, wherein a process for fabricating the Korean paper comprising the steps of:
bundling the paper mulberry, putting the paper mulberry in a container with water, boiling the paper mulberry to a degree that a skin of the paper mulberry is easily peeled off, peeling and drying the skin;
soaking the dried skin of the paper mulberry in the water, sorting out only a bast fiber portion of the dried skin, putting the bast fiber portion in caustic soda and boiling the bast fiber portion more than three hours, and wringing the bast fiber portion with a compressor to obtain a moisture-removed bast fiber; and
putting the moisture-removed bast fiber in a liquid that has been prepared by mashing roots of the paper mulberry and pressing them out, and mixing them evenly, and filtering the resulting paper solution by using a sieve.

6. The heat exchange of claim 1, wherein the first corrugation plate and the second corrugation plate are made of an aluminum material.

7. A heat exchanger of a ventilating system comprising:
heat exchange plates laminated with regular intervals so that a first air passage through which indoor air being discharged to outside of a building passes and a second air passage through which outdoor air being introduced into the interior of the building passes are sequentially formed;
first corrugation plates attached to the first air passage and obtaining a space to allow the indoor air to pass therethrough; and
second corrugation plates attached to the second air passage and obtaining a space to allow the outdoor air to pass therethrough,
wherein the heat exchange plates, the first corrugation plates and the second corrugation plates are made of a paper material with fiber intensity and with a plurality of fine holes that are able to generate a capillary action, moisture of one of the indoor air in the first air passage and the outdoor air in the second air passage being absorbed by the plurality of fine holes due to the capillary action and being directly transferred from the plurality of fine holes to the other one of the indoor air in the first air passage and the outdoor air in the second air passage.

8. The heat exchanger of claim 7, wherein the heat exchange plates, the first corrugation plates and the second corrugation plates are made of a Korean paper.

9. The heat exchanger of claim 7, wherein the heat exchange plates, the first corrugation plates and the second corrugation plates contain 60~70% of holo cellulose, 10~20% of lignin and 5~10% of lime.

10. The heat exchanger of claim 8, wherein the Korean paper constituting the heat exchange plates is fabricated with bast fiber of a paper mulberry as a key component.

11. The heat exchanger of claim 10, wherein a process for fabricating the Korean paper comprising the steps of:
bundling the paper mulberry, putting the paper mulberry in a container with water, boiling the paper mulberry to a degree that a skin of the paper mulberry is easily peeled off, peeling and drying the skin;
soaking the dried skin of the paper mulberry in the water, sorting out only a bast fiber portion of the dried skin, putting the bast fiber portion in caustic soda and boiling the bast fiber portion more than three hours, and wringing the bast fiber portion with a compressor to obtain a moisture-removed bast fiber; and
putting the moisture-removed bast fiber in a liquid that has been prepared by mashing roots of the paper mulberry and pressing them out, and mixing them evenly, and filtering the resulting paper solution by using a sieve.

* * * * *